United States Patent
Anand et al.

(10) Patent No.: US 9,733,965 B2
(45) Date of Patent: *Aug. 15, 2017

(54) CLOSED-LOOP FEEDBACK MECHANISM FOR ACHIEVING OPTIMUM PERFORMANCE IN A CONSOLIDATED WORKLOAD ENVIRONMENT

(71) Applicant: International Business Machines Corporation, Armonk, NY (US)

(72) Inventors: Vaijayanthimala K. Anand, Austin, TX (US); Dean J. Burdick, Austin, TX (US); Bruce G. Mealey, Austin, TX (US); Dirk Michel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/305,033

(22) Filed: Jun. 16, 2014

(65) Prior Publication Data
US 2015/0169350 A1    Jun. 18, 2015

Related U.S. Application Data

(63) Continuation of application No. 14/104,672, filed on Dec. 12, 2013.

(51) Int. Cl.
*G06F 9/455*    (2006.01)
*G06F 9/50*    (2006.01)

(52) U.S. Cl.
CPC ........ *G06F 9/45558* (2013.01); *G06F 9/5077* (2013.01); *G06F 9/5083* (2013.01);
(Continued)

(58) Field of Classification Search
CPC .......................................... G06F 9/45533–9/46
See application file for complete search history.

(56) References Cited

U.S. PATENT DOCUMENTS

| 8,332,854 B2 | 12/2012 | Kinsey |
| 2007/0169127 A1 | 7/2007 | Kashyap |

(Continued)

OTHER PUBLICATIONS

Simultaneous Multi-Threading on POWER7 Processors Published: No later than Feb. 8, 2010.*

(Continued)

*Primary Examiner* — Emerson Puente
*Assistant Examiner* — Paul Mills
(74) *Attorney, Agent, or Firm* — Francis Lammes; Stephen J. Walder, Jr.; Thomas E. Tyson (57) ABSTRACT

Mechanisms are provided for dynamically adjusting assignment of software threads to hardware threads in virtual machine (VM) environments. The mechanisms receive, by a virtual machine manager (VMM), an indication of workload priority from a plurality of VMs. The indication indicates a priority of a workload executing on each VM in the plurality of VMs. The mechanisms provide, by the VMM, an indication of physical resource usage to each VM. The indication of physical resource usage is an indication of physical resource usage across all VMs in the plurality of VMs. The mechanisms automatically adjust, by each VM, assignment of corresponding software threads to hardware threads based on the indication of physical resource usage and a priority of a workload executing on the VM to achieve a balance of usage of hardware threads across all VMs in the plurality of VMs.

6 Claims, 4 Drawing Sheets

(52) U.S. Cl.
CPC ........... *G06F 2009/4557* (2013.01); *G06F 2209/504* (2013.01); *G06F 2209/5021* (2013.01); *Y02B 60/142* (2013.01)

(56) References Cited

U.S. PATENT DOCUMENTS

| | | |
|---|---|---|
| 2009/0217283 A1 | 8/2009 | Anand et al. |
| 2009/0300317 A1 | 12/2009 | Hepkin et al. |
| 2012/0096293 A1 | 4/2012 | Floyd et al. |
| 2012/0227042 A1 | 9/2012 | Zedlewski et al. |
| 2012/0278800 A1 | 11/2012 | Nicholas et al. |
| 2014/0331222 A1 | 11/2014 | Zheng |

OTHER PUBLICATIONS

Capacity Planning and Performance Management on IBM PowerVM Virtualized Environment Neeraj Bhatia Published: Oct. 7, 2011.*

Friendly Virtual Machines Yuting Zhang, Azer Bestavros, Mina Guirguis, Ibrahim Matta, Richard West Published: 2005.*

Chadchan, S. M. et al., "Priority-Scaled Preemption of Radio Resources for 3GPP LTE Networks", International Journal of Computer Theory and Engineering (IJCTE), vol. 3, No. 6, Dec. 2011, pp. 743-749.

Griffiths, Nigel, "AIX Virtual Processor Folding is Misunderstood", IBM Corporation, IBM developerWorks, AIXpert Blog, Aug. 8, 2011, 2 pages.

Hall, Brian et al., "POWER7 and POWER7+ Optimization and Tuning Guide", IBM Corporation, Redbooks, Chapter 3—The POWER Hypervisor, Nov. 2012, pp. 55-66.

Kim, Dongsung et al., "Guest-Aware Priority-Based Virtual Machine Scheduling for Highly Consolidated Server", Springer Berlin Heidelberg, Euro-Par 2008—Parallel Processing, Proceedings of the International Euro-Par Conference, Las Palmas de Gran Canaria, Spain, Aug. 26-28, 2008, vol. 5168, pp. 285-294.

Michel, Dirk, "AIX on Power—Performance FAQ", IBM Corporation, IBM STG Cross Platform Systems Performance, 9 POWER7, 9.1-9.10.3, Dec. 4, 2012, pp. 65-73.

U.S. Appl. No. 14/104,672, 1 page.

* cited by examiner

CLOSED-LOOP FEEDBACK MECHANISM FOR ACHIEVING OPTIMUM PERFORMANCE IN A CONSOLIDATED WORKLOAD ENVIRONMENT

This application is a continuation of application Ser. No. 14/104,672, filed Dec. 12, 2013, status pending.

BACKGROUND

The present application relates generally to an improved data processing apparatus and method and more specifically to a closed-loop feedback mechanism for achieving optimum performance in a consolidated workload environment.

Modern computing devices are built upon multiple processing core architectures. Some computing devices provide multi-threaded cores, where a thread is a sequence of instructions that may be executed in parallel with other threads. With multi-threaded cores, there is a complexity in how the threads in the core are designed. In some architectures, such as the Power® architecture available for International Business Machines (IBM) Corporation of Armonk, N.Y., which uses Symmetric MultiThreaded (SMT) technology, such as SMT4 (4 simultaneously executing threads), SMT2 (2 simultaneously executing threads), or any number of SMT threads, i.e. SMTn, the threads in a core have equal capacity and capability if all the threads run concurrently. However, if only one thread is running, then that thread gets a boost in performance since the thread has more capacity, i.e. it can make use of more computing device resources, than it would have if all the SMT threads are running a core.

The complexity in how threads in a core are designed increases when physical cores are virtualized and shared among multiple virtual processors either in the whole core or through time sliced virtualization. In a virtualization environment, the multiple virtual processors can be spread across multiple virtual machines (VMs) or logical partitions (LPARs) with each LPAR mostly operating in isolation. It should be appreciated that a LPAR may comprise one or more VMs and each VM may comprise one or more virtual processors which operate using one or more physical processors and physical resources of the computing device.

Operating systems, such as the Advanced Interactive Executive (AIX) operating system available from IBM Corporation, running on the LPAR/VM adopts intelligent scheduling, leveraging the knowledge of the hardware capabilities. In such a case, knowing that SMT threads get different capacity/capabilities depending on the other threads' running state on a core, the AIX scheduler schedules the primary (first) thread of each virtual processor in a LPAR/VM to get the best performance when the workload does not have tasks to run on each of the hardware threads of all the virtual processors in an LPAR/VM.

In a virtualization environment, LPARs, VMs, or virtual processors may over provision capacity on a system, e.g., each LPAR/VM can ask for all the resources in the system if they are available, in terms of virtual processors. Therefore, in this over provision configuration, in modern architectures up to 10x virtual processors, for example, can be in operation and the capacity and resources of the physical cores are time sliced across these virtual processors (if over provisioned and all virtual processors are dispatched by guest operating systems in each LPAR). The AIX operating system, even though using only one thread in each virtual processor, will schedule work on all the virtual processors in each LPAR leading to a situation where physical cores are time sliced across a large number of virtual processors. That is, rather than dispatching a single virtual processor with multiple threads associated with the single virtual processor, or less than all the virtual processors in the LPAR with threads spread across the subset of virtual processors, the AIX operating system will schedule work on all the virtual processors in each LPAR and spreads the threads across all of the virtual processors with time slicing being performed with regard to the physical resources, e.g., physical cores, memory, caches, etc., shared by these virtual processors. Time slicing increases context switches between threads and results in thrashing of caches leading to relatively lower performance.

SUMMARY

In one illustrative embodiment, a method, in a data processing system comprising at least one physical processor and a memory, for dynamically adjusting assignment of software threads to hardware threads in virtual machine (VM) environments is provided. The method comprises receiving, by a virtual machine manager (VMM) executing in the data processing system, an indication of workload priority from a plurality of VMs executing in the data processing system. The indication indicates a priority of a workload executing on each VM in the plurality of VMs. The method further comprises providing, by the VMM, an indication of physical resource usage to each VM in the plurality of VMs. The indication of physical resource usage is an indication of physical resource usage across all VMs in the plurality of VMs executing in the data processing system. The method also comprises automatically adjusting, by each VM in the plurality of VMs, assignment of corresponding software threads to hardware threads based on the indication of physical resource usage and a priority of a workload executing on the VM, to achieve a balance of usage of hardware threads across all VMs in the plurality of VMs.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a closed-loop feedback mechanism for achieving optimum performance in a consolidated workload environment. The closed-loop feedback mechanism alleviates the cache thrashing that occurs with regard to the time slicing of physical resources across multiple threads spread across all the virtual processors of the logical partitions (LPARs) or virtual machines (VMs) of a system. The closed-loop feedback mechanism provides a communication pathway through which a hypervisor, or other virtual machine or LPAR management mechanism, may inform a guest operating system of a LPAR or VM of the resource usage or resource availability at the system level, such as resource availability in other VMs of the LPAR, so as to modify the guest operating system's thread scheduling behavior. Based on this feedback from the hypervisor, the guest operating system's thread scheduling may fold (reduce) or unfold (increase) the number of virtual processors being utilized by the LPAR or VM to thereby reduce or increase the time slicing associated with virtual processors depending on the availability of resources as identified by the hypervisor. Hence, a more efficient utilization of threads in a multi-threaded environment is made possible.

As mentioned above, to leverage the hardware capabilities of a multi-threaded computing system, such as a SMT enabled computing system, in a virtualized environment across multiple virtual machines, the illustrative embodiments provide a closed-loop system between a hypervisor, host operating system, or other LPAR/VM management mechanism, and a guest operating system, e.g., an instance of an operating system such as AIX, Linux, IBMi, or other operating system executing in conjunction with a virtual machine or LPAR. For purposes of the following description, it will be assumed that the LPAR/VM management mechanism is a hypervisor and the guest operating systems are instances of the AIX operating system, however the illustrative embodiments are not limited to such. In this situation, the hypervisor has the knowledge of the demands of all the LPARs/VMs and the guest operating system has the knowledge of the demands of the workloads running within the guest operating system. The guest operating system further implements business policies with regard to the various types of workloads or characteristics of the workloads so as to schedule the workloads in accordance with established business priorities specified in the business policy. For example, a business critical application, such as a database, may be given a higher priority over other workloads, such as a workload directed to development or test workloads.

When these workloads run on virtual machines on a same computing system, the business policies are applied to the software stack and hardware to ensure proper scheduling of threads within the virtual processors of the virtual machines in the computing system. In accordance with the illustrative embodiments, by creating a closed-loop system in which the hypervisor provides feedback to the guest operating systems, the guest operating system may better apply policies to schedule threads on a corresponding virtual processor. That is, the hypervisor, based on demands placed on the computing system resources, passes hints to the guest operating system to influence the manner by which the guest operating system schedules its threads.

For example, if the demands for computing system resources are lighter across the virtual machines of the computing system, meaning many of the virtual machines of a computing system are at a low load situation and thus, need lower physical processor capacity, then the hypervisor can pass "hints" or information about the excess resource availability to the guest operating systems of the virtual machines that are configured with a lower priority business policy, i.e. execute lower priority workloads. These guest operating systems executing lower priority workloads may then change their scheduler behavior to get additional processor capacity.

Figure 1:
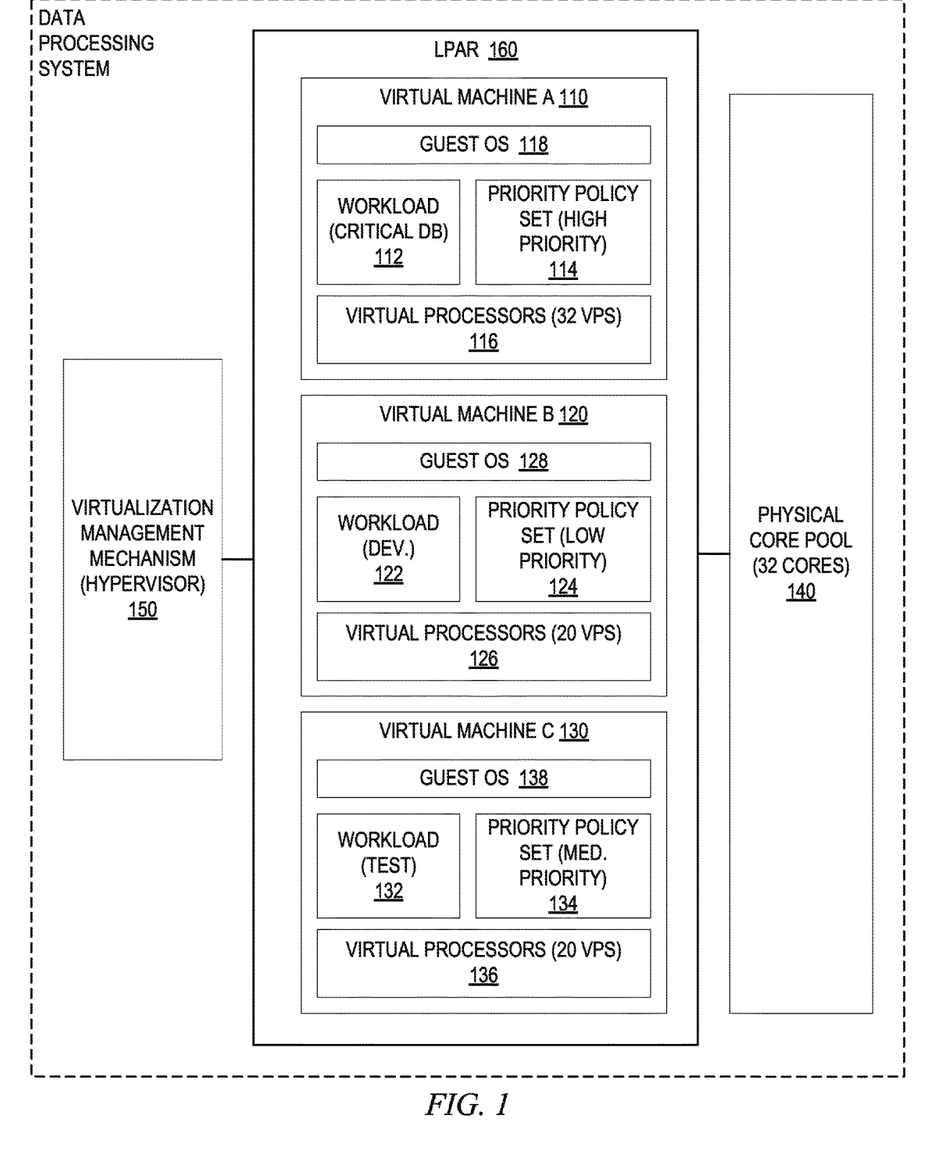
FIG. 1 is an example block diagram illustrating the primary operational elements of one illustrative embodiment in accordance with an example scenario.

FIG. 1 is an example block diagram illustrating the primary operational elements of one illustrative embodiment in accordance with an example scenario. In the following example scenario, which should only be taken as a non-limiting example of the operation of the illustrative embodiments, assume that a virtual machine A 110 is running business critical database workloads 112 with high priority policy sets 114, i.e. business policies specifying the workloads 112 to be relatively higher priority that non-critical workloads, and is configured with 32 virtual processors 116 with an entitlement or guarantee of 24 physical processor cores of the computing system (even if the computing system is fully utilized, the workloads 112 are guaranteed 24 physical processor cores. The configured number of virtual processor represents a maximum number of virtual processors that may be allocated to the workloads 112, with the maximum being achieved when the computing system is underutilized.

Assume also that virtual machine B 120 is running development workloads 122 associated with a lower priority policy set 124 and which is configured with 20 virtual processors 126 and an entitlement of 2 physical processor cores. In addition, in this example, assume that a virtual machine C 130 runs test workloads 132 with a priority policy set 134 that is higher than the low priority policy set of virtual machine B, but less than the high priority policy set 114 of virtual machine A 110. Virtual machine C is configured with 20 virtual processors 136 and an entitlement of 4 physical processor cores. The system in this example has 32 physical processor cores 140 which are shared among the three virtual machines 110, 120, and 130. The configuration policies of the various virtual machines 110, 120, and 130 is shared with the hypervisor 150 such that the hypervisor is aware of the priority policy sets 114, 124, and 134 associated with each of the virtual machines and thus, the priority of the workloads running on the various virtual machines 110, 120, and 130.

In this example, based on the high priority policy set of virtual machine A 110, the guest operating system 118 of the virtual machine A 110 will dispatch jobs to the primary threads of all of the 32 virtual processors 116 using all 32 physical processor cores when the virtual machines B 120 and C 130 are idle. As the load on the LPAR 160 increases, the guest operating system 118 of the virtual machine A 110 will start dispatching jobs to secondary threads of all the virtual processors 116 followed by tertiary threads on the virtual processors 116. At this point, virtual machine A 110 will consume all the capacity from the shared processor pool 140.

As workloads start on virtual machine B 120 and virtual machine C 130, the guest operating systems 128 and 138 of these virtual machines 120 and 130 will be guided by the lower priority policy sets 124 and 134 and will dispatch jobs on primary, secondary, and tertiary threads of the virtual processors 126 and 136, respectively. Unfolding, i.e. increasing the number of virtual processors 126 and 136 being utilized, will occur only when all of the threads of a virtual processor 126, 136 are utilized and thus, moving on to the next virtual processor 126, 136 or adding additional virtual processors. That is, the "guidance" of the virtual machines 120 and 130 involves the hypervisor or virtual machine manager informing the virtual machine that resources are low/high at the system level, in which case the virtual machine changes its scheduling policy to increase/decrease the number of virtual processors the virtual machine is using and to use all of the hardware threads on the remaining virtual machines.

As the workload on virtual machines B 120 and C 130 increases, there are more virtual processors that are being dispatched. That is, the hypervisor or virtual machine manager 150 dispatches virtual processors to virtual machines, the virtual processor containing all of the virtualized hardware threads (software threads). The virtual machine determines whether to dispatch software threads onto some or all of the hardware threads of the virtual processor, e.g., in the Power7 processor architecture available from IBM Corporation, the hypervisor dispatches all four threads of the virtual processor together and thus, dispatches "the virtual processor," while the AIX operating system of the virtual machine determines which of these hardware threads will have software threads assigned to run on them.

As a result, the 32 physical processor cores 140 are time sliced on these virtual processors 126 and 136 of the virtual machines B 120 and C 130, meaning that each virtual processor 126, 136 is given a slice of time during which it may run its workload on corresponding physical processor(s) 140 followed by a time slice given to another virtual processor 126, 136, and so on, such that multiple context switches between threads, virtual processors, virtual machines, and even logical partitions is necessary. This results in thrashing and lower system performance, impacting even the higher priority virtual machine A 110 performance since the higher priority virtual machine A 110 shares the physical resources of the processor pool 140.

In accordance with the illustrative embodiments, the hypervisor 150, host operating system or other virtualization management mechanism, passes hints or information about the cache thrashing to all of the virtual machines A-C 110, 120, and 130. That is, the hypervisor 150, for example, may recognize that processor resources are constrained and thus, the hypervisor 150 notifies the virtual machines that have "over-provisioned" (i.e., that have a number of configured virtual processors that is greater than their entitled number of virtual processors) that they need to reduce their number of virtual processors, i.e. fold the number of virtual processors. When the virtual machine receives this notification, it reduces its number of virtual processors and reconfigures to better utilize its remaining virtual processors by using all hardware (SMT) threads instead of just one hardware thread. This notification may be done in accordance with the priorities in the business policy, or priority policy, set associated with the virtual machines or hypervisor. Lower priority virtual machines would be given this notification relatively sooner than higher priority virtual machines and would be required to reduce the number of virtual processors more so than the higher priority virtual machines.

Based on the priority policy, as well as the autonomic system optimization guidance, the guest operating system of the particular virtual machine B, C 120, 130 may fold or unfold the virtual processors 126, 136 until balance is achieved and overall system performance is improved, where "balance" refers to the virtual machines having an appropriate number of virtual processors given the system load and prioritization policies.

For example, in one illustrative embodiment, since virtual machine A 110 is a high priority virtual machine running high priority workloads, the virtual machine A 110 would not fold down its virtual processors, while virtual machines B and C 120 and 130 would fold down to 1 virtual processor since these virtual machines 120 and 130 are running lower priority workloads. The particular number of virtual processors to fold down to or unfold to may be determined in accordance with the number of virtual processors configured, the virtual processor entitlement, and specifications in the applicable priority policy. In some cases, some over-provisioning of the virtual machines may be allowed, but this would depend on resource availability and the priority of the particular virtual machine. For example, if the computing system is highly loaded, higher priority virtual machines may be allowed to remain at an over-provisioned state, but lower priority virtual machines may be notified that they are not going to receive any virtual processor resources above their entitlement and should scale down to their entitled number of processors.

Thus, even though virtual machines B and C 120 and 130 have higher physical/virtual processor entitlements, virtual machine B 120 and virtual machine C 130 endure a lower performance so as not to interfere with the higher priority workload execution in the virtual machine A 110. This decision is made by the guest operating systems of the virtual machines B 120 and C 130 based on priority policies. In some illustrative embodiments, these priority policies specify the number of virtual processors that remain operational in a virtual machine at various load levels within the virtual machine.

It should be appreciated that the priority policy sets 114 may be static or dynamic. A static policy is one where a hypervisor, or other virtual machine manager, owns the static policy and notifies the virtual machines when their resource usage does not match the virtual machines' assigned priority for a given situation, so that adjustments may be made. This policy only prioritizes workloads at the virtual machine level and does not consider the specifics of the workload in the virtual machine. The dynamic policy, on the other hand, are owned by the individual virtual machines and represent the priorities of the workloads actually running in the virtual machine. The dynamic policy conveys the priorities of the workloads to the hypervisor based on which workloads are current executing in the virtual machine. The hypervisor may then grant or deny more resources, depending on the current relative priority of the other virtual machines.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
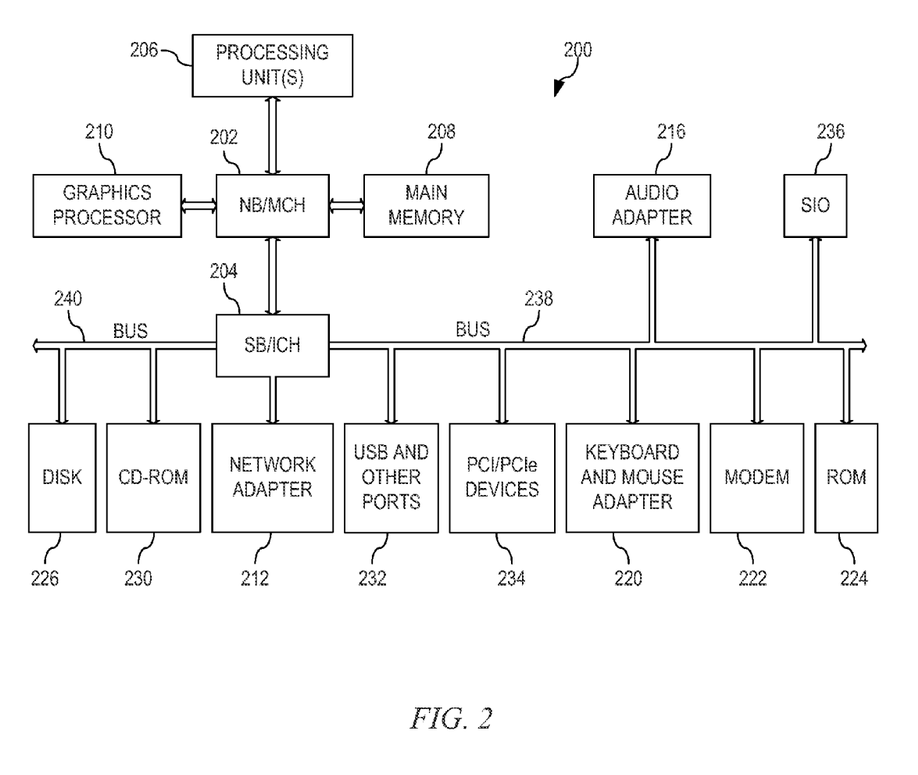
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIG. 2 is provided hereafter as an example environment in which aspects of the illustrative embodiments may be implemented. It should be appreciated that FIG. 2 is only an example and is not intended to assert or imply any limitation with regard to the environments in which aspects or embodiments of the present invention may be implemented. Many modifications to the depicted environment may be made without departing from the spirit and scope of the present invention.

FIG. 2 is a block diagram of an example data processing system in which aspects of the illustrative embodiments may be implemented. Data processing system 200 is an example of a computer, such as client computing system or server computing system, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In accordance with the illustrative embodiments, the data processing system 200 in FIG. 2 may implement one or more logical partitions (LPARs) with each LPAR comprising one or more virtual machines (VMs) having one or more virtual processors (VPs) executing one or more threads. These virtual resources of the data processing system 200 share the physical resources of the data processing system, e.g., processing unit(s) 206, main memory 208, and the like. In so doing, for example, time slicing may be used to provide access to the physical resources by each of the VPs of each of the VMs of each of the LPARs such that each virtual resource may utilize a portion of the physical resources. In one illustrative embodiment, the processing unit(s) 206 may comprise a plurality of processing units, e.g., 32 processing units or cores, which may be shared by a plurality of VPs of a plurality of VMs of one or more LPARs.

The processing unit 206 may further execute a virtualization management mechanism that manages the virtual resources, e.g., LPARs, VMs, VPs, etc. of the data processing system 200. In one illustrative embodiment, the virtualization management mechanism is a hypervisor or host operating system that comprises virtualization management logic and logic for providing "hints" or information about resource availability and utilization of certain virtual machines to other virtual machines of the same or different logical partitions for purposes of adjusting thread scheduling performed by the guest operating systems of the virtual machines or logical partitions. For example, the processing unit 206 may implement the hypervisor 150 of FIG. 1, for example, which comprises logic for providing hints to guest operating systems of the resource availability and resource utilization of other virtual machines of the same or different logical partitions so that the guest operating systems may utilize this information to adjust the thread scheduling performed by these guest operating systems.

As described previously, the hypervisor may monitor the resource utilization of the various virtual machines (VMs) executing on the data processing system 200 and may communicate such information to the guest operating systems of each of the logical partitions (LPARs) or VMs. The guest operating systems may comprise logic for ingesting such hint information from the hypervisor and adjusting their own thread scheduling operations to account for the availability, or lack of availability, of data processing system resources. For example, the guest operating systems may fold or unfold virtual processors (VPs) associated with the guest operating system and corresponding VM so as to decrease or increase the number of VPs utilized by the VM. Threads may thereafter be dispatched to the various VPs so as to achieve an optimum performance by either spreading the threads across a larger number of VPs utilizing a primary thread associated with each VP to achieve a higher performance when the workload at the system-level, i.e. across all the virtual machines, is low, or to compact the threads into a smaller number of VPs when workload levels are high so as to avoid interfering with the performance of higher priority workloads on other VPs of other VMs.

The folding or unfolding of VPs associated with a VM may be performed not only on a basis of the feedback information, or "hints," sent to the guest operating systems by the hypervisor, but also based on priorities associated with workloads and priority policies established with the guest operating systems. Thus, based on the workload priority, the feedback information, and the priority policies, the guest operating system may determine whether to fold or unfold VPs of a VM to achieve better performance of the computing system as a whole with regard to dispatching threads and sharing of physical resources by the threads of the VPs.

Figure 3:
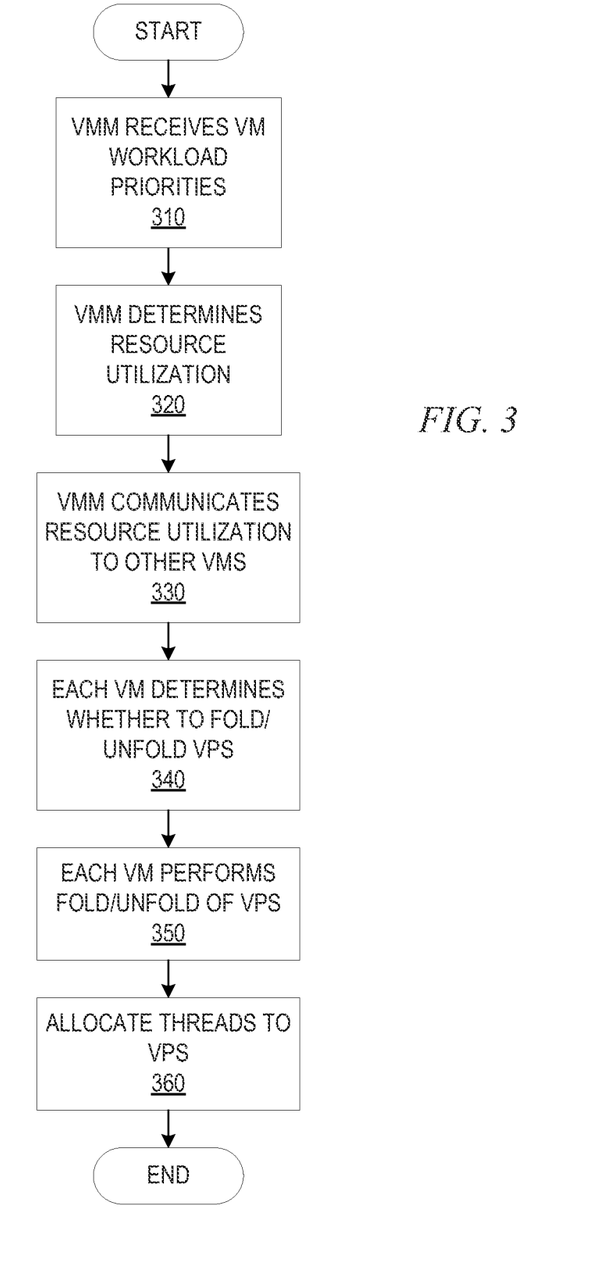
FIG. 3 is a flowchart outlining an example operation of a virtualization management mechanism in accordance with one illustrative embodiment.

FIG. 3 is a flowchart outlining an example operation of a virtualization management mechanism in accordance with one illustrative embodiment. As shown in FIG. 3, the operation starts with the virtualization management mechanism (VMM) receiving indications from the virtual machines executing on the data processing system as to the priorities of the workloads being executed by the various virtual machines (step 310). The virtualization management mechanism, from the indications of the workloads being executed by the various virtual machines, determines resource utilizations of the various virtual machines (step 320). The virtualization management mechanism provides a notification of resource utilization to each of the virtual machines executing on the data processing system (step 330). Each of the virtual machines then, based on the resource utilization specified in the notification from the virtualization management mechanism, determine whether to fold or unfold their associated number of virtual processors (VPs) based on the virtual machine priority, the current number of allocated physical/virtual processors, and a current availability of shared resources in the computing system as determined from the resource utilization (step 340). Each virtual machine then folds or unfolds the virtual processors associated with the virtual machine (step 350) and allocates threads to the virtual processors (step 360). The operation then terminates.

Figure 4:
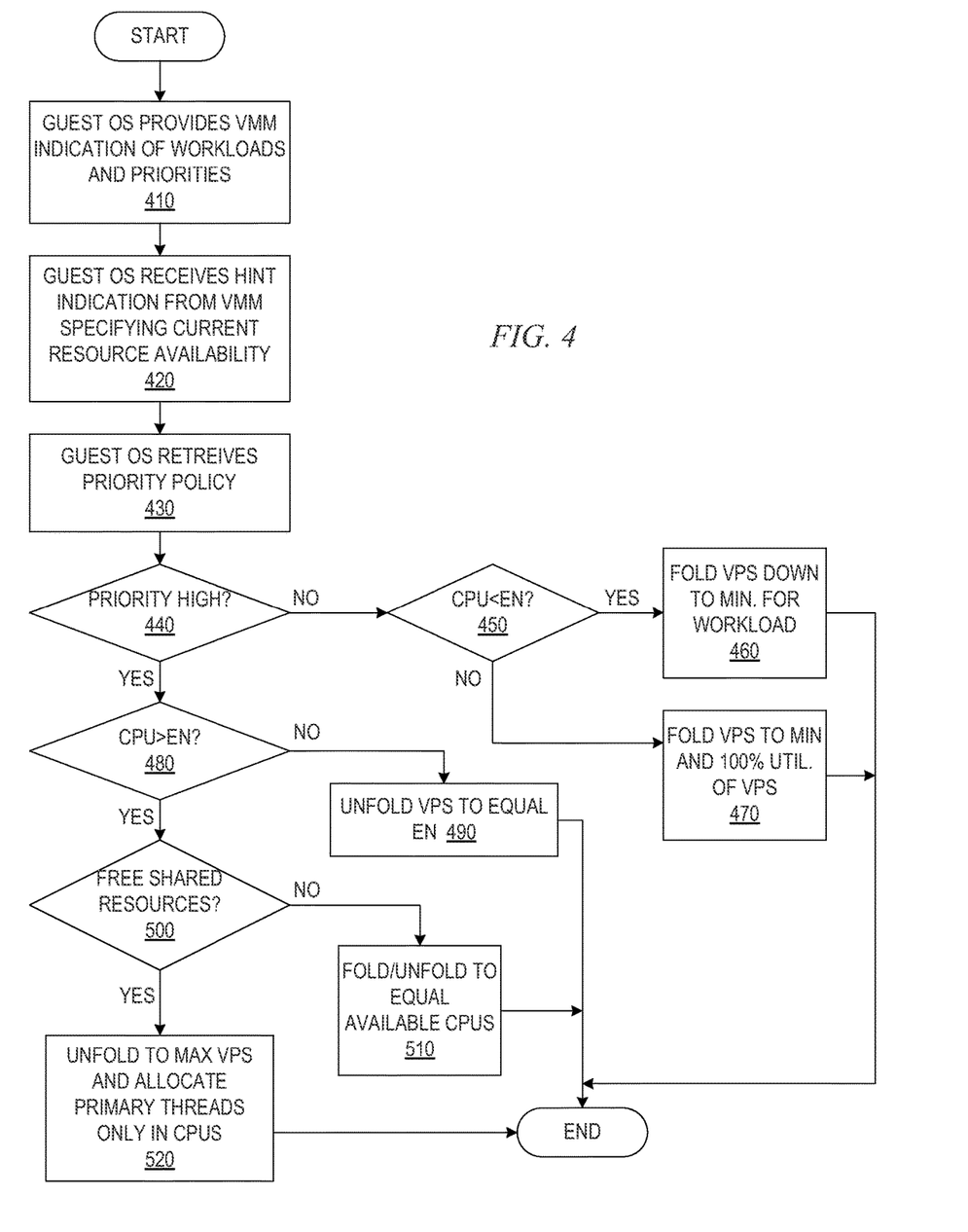
FIG. 4 is a flowchart outlining an example operation of a guest operating system of a virtual machine in accordance with one illustrative embodiment.

FIG. 4 is a flowchart outlining an example operation of a guest operating system of a virtual machine in accordance with one illustrative embodiment. It should be appreciated that while FIG. 4 shows an example operation for a single guest operating system of a single virtual machine, the operation may be performed with regard to each virtual machine and corresponding guest operating system presently executing in a computing system.

As shown in FIG. 4, the operation starts with the guest operating system providing information to a virtualization management mechanism indicating the workloads and their priorities executing on virtual processors of the virtual machine associated with the guest operating system (step 410). The guest operating system receives a hint indication from the virtualization management mechanism specifying the current resource utilization or availability of the data processing system system based on the current workloads executing on virtual machines across the data processing system (step 420). This may be the notification discussed above, for example. The guest operating system retrieves a priority policy for specifying a manner for managing virtual processors associated with virtual machines based on resource availability and workload priority (step 430).

A determination is made, based on the priority policy, as to whether the priority of the virtual machine and its workloads is a relatively high priority or relatively low priority (step 440). It should be appreciated that while the illustrative embodiments will be described with regard to priorities being either high or low, the illustrative embodiments are not limited to such. Rather a spectrum of priorities may be utilized with different operations for folding or unfolding virtual processors according to various degrees of folding or unfolding may be utilized without departing from the spirit and scope of the illustrative embodiments.

If the priority of the virtual machine is relatively low, a determination is made as to whether the physical processor (CPU) usage of the virtual machine is less than its entitlement (EN) under the priority policy (step 450). If so, then the number of virtual processors associated with the virtual machine is folded down to a minimum number needed for the current low priority workload (step 460). If the physical processor usage is equal to or greater than the entitlement of the virtual machine, then the virtual processors of the virtual machine are folded down to a minimum number of virtual processors needed and threads are allocated to the remaining (unfolded) virtual processors so that each of the remaining virtual processors are 100% utilized (step 470).

If the virtual machine's priority is relatively high (step 440), then a determination is made as to whether the physical processor (CPU) utilization of the virtual machine is greater than the virtual machine's entitlement (EN), i.e. the guaranteed physical processor capacity guaranteed to the virtual machine (step 480). If not, then the virtual processors (which may cover a capacity above and beyond the entitlement of the virtual machine) associated with the virtual machine are unfolded to equal the entitlement of the virtual machine (step 490). If the physical processor utilization is greater than the entitlement of the virtual machine, a determination is made as to whether there are available free shared resources in the computing system, i.e. the computing system's processor resources allowed to be shared among all the virtual machines or a set of virtual machines in the computing system (step 500). If there are no available free shared resources in the computing system, then the number of virtual processors is folded/unfolded to match the available processors from the shared resources (step 510). If there are available free shared resources in the computing system, then the number of virtual processors allocated to the virtual machine is unfolded to equal the maximum number of virtual processors with each of the virtual processors using just the primary threads in each physical processor (step 520). The operation then terminates.

Thus, the illustrative embodiments provide mechanisms for providing feedback hint information from the virtualization management mechanism to the guest operating systems of the virtual machines execution on the data processing system so as to modify the operation of the thread scheduling of the guest operating systems to take into account resource availability from other virtual machines and the priority of workloads executing in each of the virtual machines. The illustrative embodiments balance the concerns of workload priority with performance so as to allow high priority workloads to be executed without impediment but at the same time providing a maximum performance for lower priority workloads based on resource availability.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A method, in a data processing system comprising a plurality of physical processors and a memory, for dynamically adjusting assignment of software threads to hardware threads in virtual machine (VM) environments, the method comprising:
   receiving, by a virtual machine manager (VMM) executing in the data processing system, an indication of workload priority from each VM of a plurality of VMs executing on the data processing system, wherein the indication indicates a priority of a workload executing on the VM determined from a priority policy associated with the VM;
   monitoring, by the VMM, physical resource usage across all VMs in the plurality of VMs to determine a load level in the data processing system;
   sending, by the VMM in response to determining a high load level, a notification indicating the high load level to each VM in the plurality of VMs that is over-provisioned, wherein
   the notifications are sent in accordance with priorities of workloads executing on the VMs in the plurality of VMs such that notifications are sent to relatively low priority VMs prior to sending notifications to relatively high priority VMs in the plurality of VMs; and
   starting with relatively low priority VMs in the plurality of VMs then by relatively higher priority VMs in the plurality of VMs, automatically adjusting, by each VM in the plurality of VMs that is over-provisioned, assignment of corresponding software threads to hardware threads by performing one of folding or unfolding a number of virtual processors (VPs) allocated to the VM based on the indicated high load level and the priority of the workload executing on the VM, wherein performing one of folding or unfolding the number of VPs allocated to the adjusting VM comprises:
      determining whether the priority of the adjusting VM is relatively low or relatively high based on the priority policy associated with the adjusting VM;
      in response to the priority of the adjusting VM being relatively low, folding the number of VPs allocated to the VM down to a minimum number of VPs required for the workload executing on the adjusting VM and assigning software threads to all of the hardware threads represented by the allocated VPs of the adjusting VM to achieve complete utilization of allocated VPs of the adjusting VM; and
      in response to the priority of the adjusting VM being relatively high, folding or unfolding the number of VPs allocated to the adjusting VM covering a capacity above and beyond the entitlement of the adjusting VM to match the number of available processors from a set of shared resources available in the data processing system up
      to a maximum number of VPs associated with the adjusting VM, wherein software threads are assigned to only the primary hardware threads represented by the allocated VPs when allocated the maximum number of VPs.

2. The method of claim 1, wherein the VMM is a hypervisor executing in the data processing system.

3. The method of claim 1 further comprising:
   sending, by the VMM in response to determining a low load level, a notification indicating the low load level to each VM in the plurality of VMs; and
   automatically adjusting, by each relatively low priority VM in the plurality of VMs in response to receiving the notification indicating the low load level, assignment of corresponding software threads to hardware threads by unfolding VPs allocated to the VM up to a number of VPs greater than the minimum number of VPs and assigning software threads to less than all of the hardware threads represented by the allocated VPs.

4. The method of claim 1 further comprising:

identifying, by a first VM of the plurality of VMs, a change in the workload executing on the first VM; and sending, by the first VM, an indication of workload priority for the changed workload to the VMM.

5. The method of claim 1, wherein at least one of the high priority workloads comprises a business critical database application.

6. The method of claim 1, wherein at least one of the low priority workloads comprises one of a test workload and a development workload.

* * * * *